(12) United States Patent
Gregerson et al.

(10) Patent No.: US 12,017,167 B2
(45) Date of Patent: Jun. 25, 2024

(54) FILTER WITH IMPROVED FLUID FLOW

(71) Applicant: ENTEGRIS, INC., Billerica, MA (US)

(72) Inventors: Barry L. Gregerson, Deephaven, MN (US); Christopher P. Barck, Westford, MA (US)

(73) Assignee: ENTEGRIS, INC., Billerica, MA (US)

( * ) Notice: Subject to any disclaimer, the term of this patent is extended or adjusted under 35 U.S.C. 154(b) by 242 days.

(21) Appl. No.: 17/076,204

(22) Filed: Oct. 21, 2020

(65) Prior Publication Data

US 2021/0129055 A1 May 6, 2021

Related U.S. Application Data

(60) Provisional application No. 62/931,290, filed on Nov. 6, 2019.

(51) Int. Cl.
*B01D 35/30* (2006.01)
*B01D 46/24* (2006.01)

(52) U.S. Cl.
CPC .......... *B01D 35/30* (2013.01); *B01D 46/2411* (2013.01); *B01D 2201/302* (2013.01); *B01D 2201/304* (2013.01); *B01D 2313/20* (2013.01)

(58) Field of Classification Search
CPC .............. B01D 35/30; B01D 46/2411; B01D 2201/302; B01D 2201/304; B01D 2313/20; B01D 29/925; B01D 29/33; B01D 2201/303; B01D 36/001; B01D 46/0046; B01D 61/00; B01D 65/00
USPC .......... 210/232, 455, 285, 304–306, 321.76, 210/321.85, 321.9, 440–443, 451, 456, 210/472, 218, 436, 437, 457, 450, 493.2
See application file for complete search history.

(56) References Cited

U.S. PATENT DOCUMENTS

| | | | |
|---|---|---|---|
| 280,828 A * | 7/1883 | Howes | B01D 29/11 210/443 |
| 3,637,078 A | 1/1972 | Hollar | |
| 4,154,688 A * | 5/1979 | Pall | B01D 63/067 210/493.1 |
| 5,294,339 A | 3/1994 | Jorgens | |
| 5,628,909 A | 5/1997 | Bellhouse | |
| 5,690,765 A | 11/1997 | Stoyell | |
| 6,103,120 A | 8/2000 | Hopkins | |
| 6,110,368 A | 8/2000 | Hopkins | |
| 6,294,090 B1 | 9/2001 | Nussbaumer | |
| 6,709,598 B1 | 3/2004 | Pearl | |

(Continued)

FOREIGN PATENT DOCUMENTS

| CN | 105854616 A | 8/2016 |
|---|---|---|
| CN | 104528975 B | 1/2017 |

(Continued)

*Primary Examiner* — Madeline Gonzalez

(57) ABSTRACT

Disclosed herein is a filter having a housing having first and second end surfaces and interior and exterior surfaces, a membrane disposed within the tubular housing, a first end cap sealed to the first end surface of the tubular housing and the first end surface of the membrane; a second end cap sealed to the second end surface of the tubular housing and the second end surface of the membrane; and a fluid channel formed in the interior surface of the housing in a helical pattern. The helical pattern has a helical pitch in an axial direction of the housing of less than or equal to about 60 mm.

10 Claims, 5 Drawing Sheets

(56) References Cited

U.S. PATENT DOCUMENTS

| | | | |
|---|---|---|---|
| 2007/0119772 A1* | 5/2007 | Hiranaga | B01D 36/001 |
| | | | 210/493.2 |
| 2007/0289917 A1 | 12/2007 | Mylin | |
| 2008/0035549 A1* | 2/2008 | Saarinen | B01D 29/908 |
| | | | 210/433.1 |
| 2015/0041380 A1 | 2/2015 | Lin | |
| 2015/0265960 A1 | 9/2015 | Girondi | |
| 2015/0336033 A1* | 11/2015 | Neitzel | B01D 29/235 |
| | | | 210/493.2 |
| 2019/0217253 A1 | 7/2019 | Syron | |

FOREIGN PATENT DOCUMENTS

| | | |
|---|---|---|
| CN | 107983162 A | 5/2018 |
| CN | 108479401 A | 9/2018 |
| CN | 214131079 U | 9/2021 |
| JP | 2004130253 A | 4/2004 |
| JP | 2015029946 A | 2/2015 |
| JP | 2015029984 A | 2/2015 |
| TW | 200940146 A | 10/2009 |
| WO | 0189669 A2 | 11/2001 |

\* cited by examiner

FILTER WITH IMPROVED FLUID FLOW

CROSS-REFERENCE TO RELATED APPLICATIONS

This application claims the benefit under 35 USC 119 of U.S. Provisional Patent Application No. 62/931,290, filed Nov. 6, 2019, the disclosure of which is hereby incorporated herein by reference in its entirety.

TECHNICAL FIELD

The present disclosure generally relates to a fluid-processing filter assembly.

BACKGROUND

Fluids used in manufacturing, for example in the semiconductor manufacturing industry, often flow through multiple filters to remove contaminants from the fluid before the fluid is dispensed. The filter used at the last filtration point prior to dispensing a fluid into a system is generally called a point of use (POU) or point of dispense (POD) filter. Filters typically have an integral filter cartridge including a porous membrane surrounded by a cage. The filter cartridge is disposed in a housing.

There are typically tight space constraints in the manufacturing equipment for the filters. There is a need for a filter with a compact design that also provides adequate flow rate for filtering fluids. Allows to decrease size of filter while increases the amount of membrane to achieve a smaller filter with increased flow rate. Can include more membrane in a smaller filter to achieve increased flow rate

SUMMARY

Disclosed herein is a filter comprising, consisting essentially of, or consisting of: a tubular housing having first and second end surfaces and interior and exterior surfaces, a membrane disposed within the tubular housing, a first end cap sealed to the first end surface of the tubular housing and the first end surface of the membrane; a second end cap sealed to the second end surface of the tubular housing and the second end surface of the membrane; and a fluid channel formed in the interior surface of the tubular housing in a helical pattern. The helical pattern has a helical pitch in an axial direction of the tubular housing of less than or equal to about 60 mm. Filters with these features allows for a decrease the size of a given filter while also increasing the amount of membrane disposed in the filter while also achieving an increased flow rate.

In some embodiments, the filter further comprises, consists essentially of, or consists of a core disposed within the tubular housing wherein the membrane is positioned between the core and the tubular housing.

In an embodiment, a filter includes a housing having interior and exterior surfaces, a membrane disposed within the housing, and a fluid channel formed in the interior surface of the housing. The fluid channel has a helical pattern with a helical pitch in an axial direction of the housing of less than or equal to about 60 mm, the fluid channel formed between raised portions of the interior surface of the housing.

In an embodiment, the helical pattern has a helical angle of less than or equal to about 45 degrees.

In an embodiment, the filter further includes a core disposed within the housing wherein the membrane is positioned between the core and the housing.

In an embodiment, the filter further includes a first end cap, wherein the first end cap includes a first opening acting as an inlet for fluid and a second opening acting as an outlet for the fluid.

In an embodiment, first end cap further includes a third opening acting as a vent.

In an embodiment, the inlet for the fluid directs the fluid into the fluid channel. In an embodiment, the filter includes a tube configured to receive the fluid from the inlet and a port configured to provide fluid to the fluid channel, and the tube and the port are configured such that the fluid is introduced into the fluid channel at a bottom of the fluid channel. In an embodiment, the exterior surface of the housing has a generally cylindrical shape, and the tube is disposed in a projection extending outwards from the generally cylindrical outer surface of the housing.

In an embodiment, the outlet is configured to allow the fluid within the fluid channel to leave the filter.

In an embodiment, each of the inlet and the outlet have a different height.

In an embodiment, the membrane is in direct contact with the raised portions of the interior surface. In an embodiment, there is no cage located between the membrane and the raised portions of the interior surface.

In an embodiment, a filter housing includes an interior surface, an exterior surface, and a fluid channel formed in the interior surface of the filter housing. The fluid channel has a helical pattern with a helical pitch in an axial direction of the housing of less than or equal to about 60 mm, the fluid channel formed between raised portions of the interior surface of the housing.

In an embodiment, the helical pattern has a helical angle of less than or equal to about 45 degrees.

In an embodiment, the housing includes a first end configured to be connected to a first end cap and a second end configured to be connected to a second end cap, wherein the first end cap includes a first opening acting as an inlet for fluid and a second opening acting as an outlet for the fluid.

In an embodiment, a method of filtering a fluid includes introducing the fluid into a filter through an inlet and directing the fluid through a fluid channel formed in a housing of the filter. The fluid channel has a helical pattern with a helical pitch in an axial direction of the housing of less than or equal to about 60 mm. The fluid channel is formed between raised portions of an interior surface of the housing. The method also includes passing the fluid through a membrane, wherein the membrane is in direct contact with the raised portions.

In an embodiment, directing the fluid through the fluid channel is performed prior to passing the fluid through the membrane.

BRIEF DESCRIPTION OF THE DRAWINGS

The disclosure may be more completely understood in consideration of the following description of various illustrative embodiments in connection with the accompanying drawings

Figure 1:
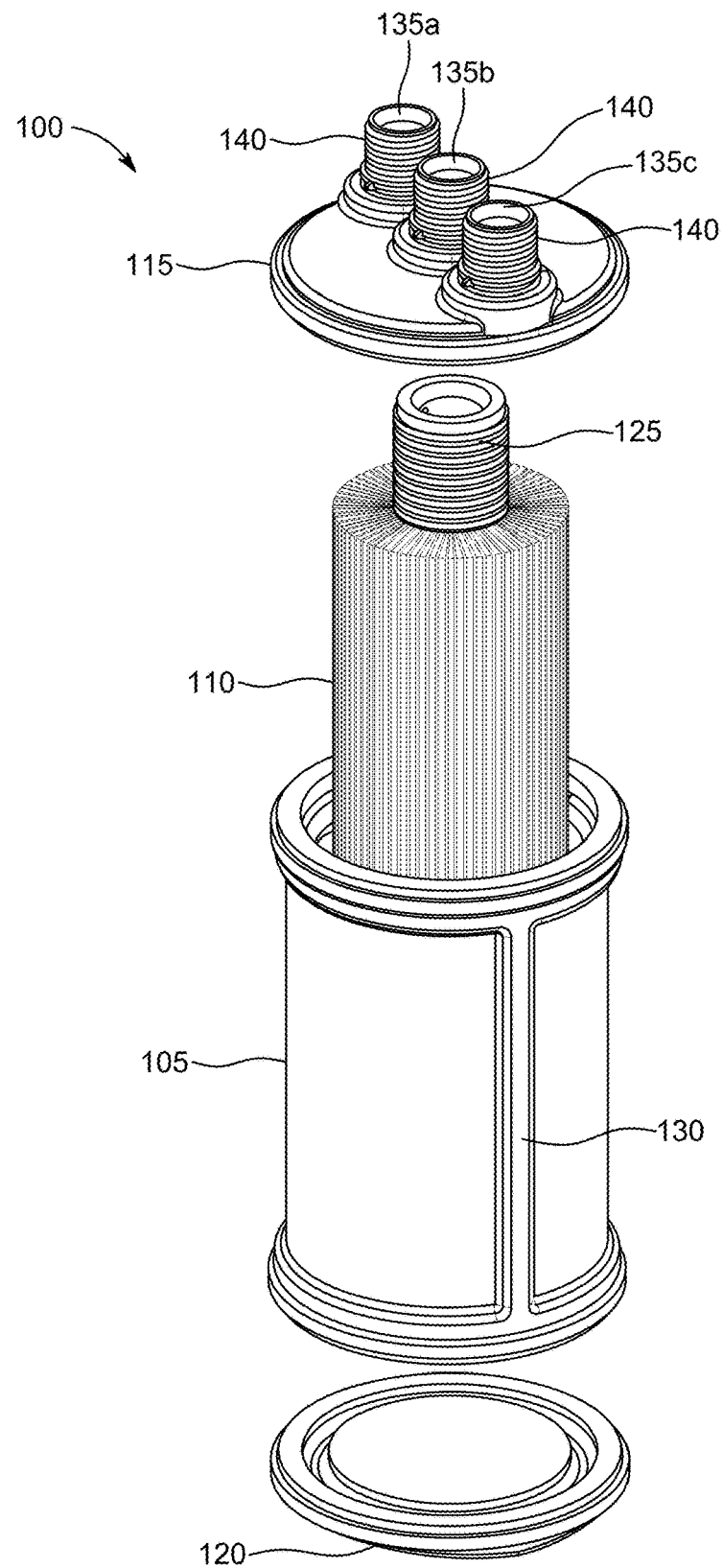
FIG. 1 is an exploded view of an exemplary filter.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

Like reference numbers refer to like parts throughout.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g. 1 to 5 includes 1, 1.5, 2, 2.75, 3, 3.80, 4 and 5).

The following detailed description should be read with reference to the drawings in which similar elements in different drawings are numbered the same. The detailed description and the drawings, which are not necessarily to scale, depict illustrative embodiments and are not intended to limit the scope of the invention. The illustrative embodiments depicted are intended only as exemplary. Selected features of any illustrative embodiment may be incorporated into an additional embodiment unless clearly stated to the contrary.

The desire to reduce the size of filters must be balanced with maintaining an adequate flow rate through the filter. Disclosed herein are filters that do not include an integral filter cartridge by eliminating the use of a cage. Instead the membrane is disposed in a housing wherein a fluid channel is formed in the interior surface of the housing in a helical pattern. The area of the interior surface of the housing located between turns of the helix contact the membrane and provide support to the membrane. The elimination of the cage allows for additional membrane to be placed in the filter and the helical fluid channel provides for adequate support of the membrane and flow of the fluid to be filtered through the filter. In some embodiments, the helical pitch of the helical fluid channel in an axial direction of the housing is less than or equal to about 60 mm to ensure adequate support for the membrane as well as maintaining adequate flow of fluid through the filter.

Figure 2:
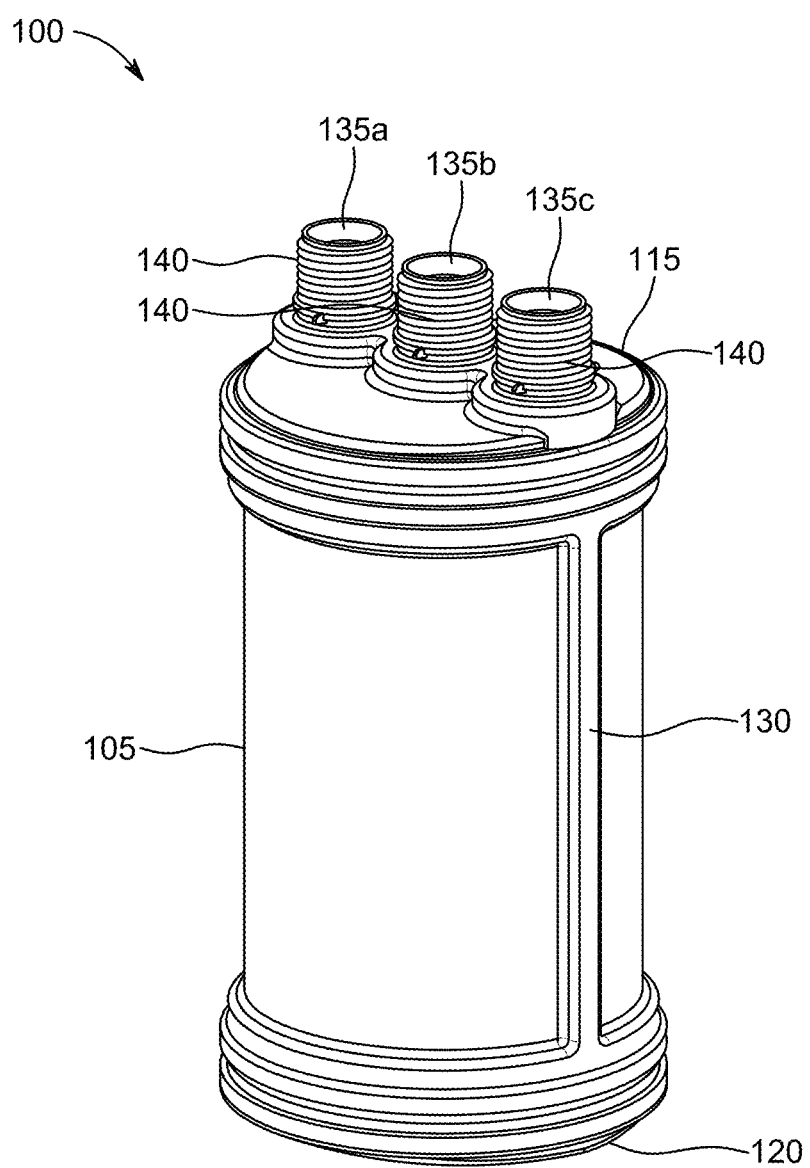
FIG. 2 is an isometric view of an exemplary filter.

FIGS. 1 and 2 depict exploded and isometric views, respectively, for an exemplary filter 100. The filter 100 includes a housing 105, a membrane 110 disposed in the housing, a first end cap 115 and a second end cap 120. As shown, in FIG. 1, in some embodiments, the filter may also include a core 125 about which the membrane is disposed. In other embodiments, the core 125 shown in FIG. 1 can be omitted.

The housing 105 can form, at least in part, a housing defining an internal space. The first end cap 115 and/or second end cap 120 can be used in addition to housing 105 to define the internal space. The internal space can accommodate the membrane 110 and optionally the core 125, along with a fluid being filtered using said membrane 110. The housing 105 can include a rib 130. In an embodiment, the rib 130 extends between an end where the first end cap 115 is attached to the housing 105 and an opposite end of the housing where the second end cap 120 is attached to the housing 105. The rib 130 can be used in molding of the housing 105, particularly when molding structure of interior surfaces of the housing 105, detailed below and shown in FIGS. 3 and 4. In embodiments, the rib 130 can further provide reinforcement or allow engagement for manual or automated handling of the filter 100.

In an embodiment, the first end cap 115 includes one or more connectors such as connectors 135*a,b,c* shown in FIGS. 1 and 2. In an embodiment, each of the connectors 135*a,b,c* includes threading 140 surrounding an aperture 145. In embodiments, only two such connectors 135*a,b* can be included. The threading 140 can allow connection of a fluid line to each respective connector 135*a,b,c*. In embodiments, threading 140 can be replaced with any other suitable mechanical connector for forming a sealed connection between fluid lines and the respective connectors 135*a,b,c*. The apertures 145 can allow fluid to pass into or out of housing 105, for example to allow fluid that is being filtered to enter or exit the housing 105 or to allow venting of air or any other fluid from the housing 105. In an embodiment, the connectors 135*a,b,c* can include inlet 135*a*, outlet 135*b*, and vent 135*c*. The inlet 135*a* can allow the fluid to be filtered to enter housing 105. Outlet 135*b* can allow the fluid that has been filtered using membrane 110 to exit the housing 105. The outlet 135*b* can be positioned such that membrane 110 is located within the fluid path from inlet 135*a* to outlet 135*b* through the internal space defined by housing 105 and first and second end caps 115, 120. The vent 135*c* can allow other fluids to leave housing 105, such as, as a non-limiting example, allowing air to exit the housing 105 when the fluid to be filtered is introduced into a previously unused filter 100. Fluids, including both those filtered by the filter 100 and also other fluids such as the fluid vented at 135*c* can be matter in either the gaseous or liquid phase.

Figure 3:
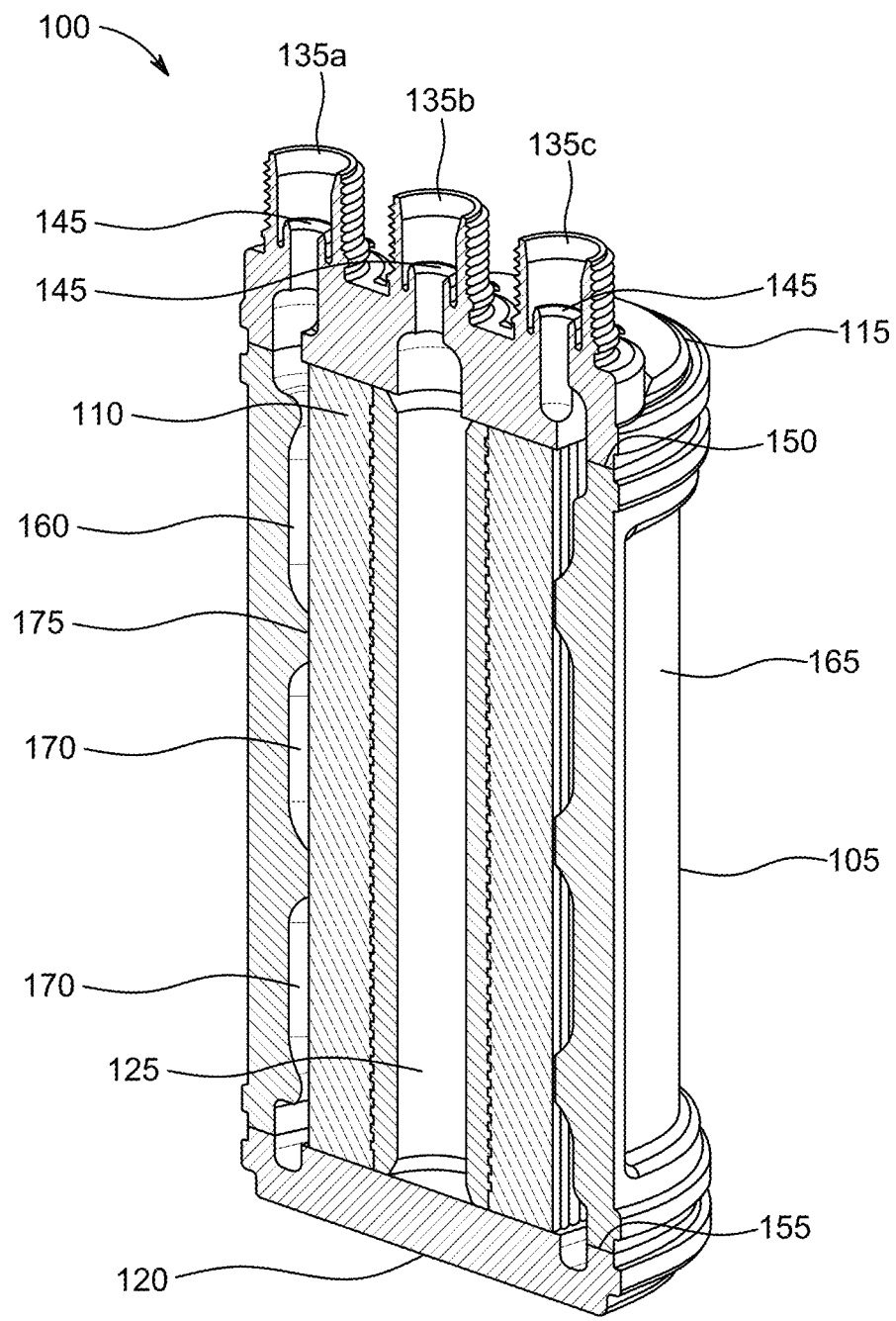
FIG. 3 is a cross-sectional view of an exemplary filter.
Figure 4:
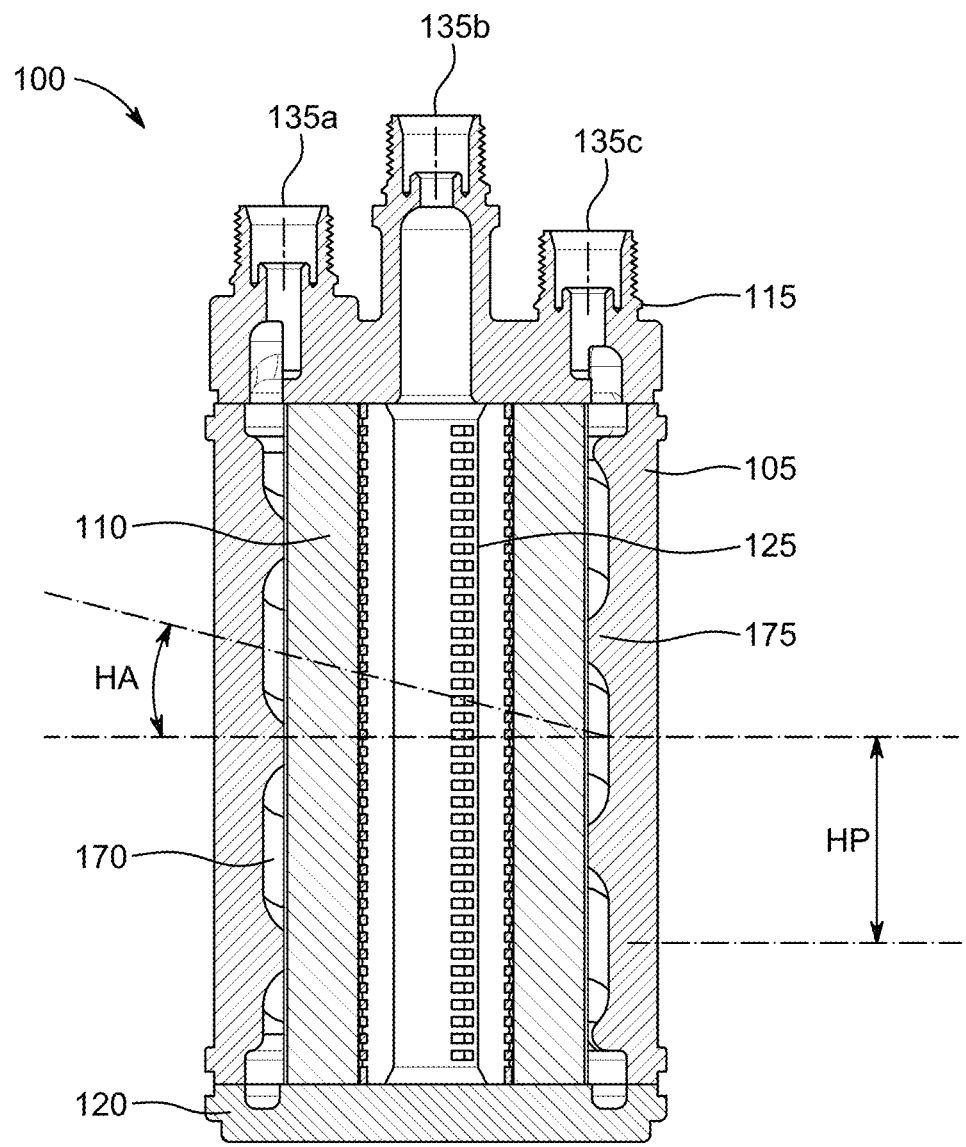
FIG. 4 is a cross-sectional view of an exemplary filter housing.

FIG. 3 depict sectional views of filter 100, and filter housing 105, respectively. FIG. 4 also depicts a sectional view of filter 100 and filter housing 105, except that FIG. 4 show connectors 135*a,b,c* are not all the same height, such connectors according to embodiments can be provided in different positions or arrangements, or configurations so long as a fluid flow path through housing 105 from inlet 135*a* to outlet 135*b* requires the fluid to pass through membrane 110. FIG. 3 shows that connectors 135 *a,b,c*, are all the same height. In the exemplary embodiment shown in FIG. 4, the connectors 135 *a,b,c* can each positioned and/or configured (i.e. by varying the height of the corresponding threading) to be provided at different heights. In embodiments, the position, arrangement, and/or configuration of connectors 135 *a,b,c* can be selected to correspond to the positions of fluid line connections on the device that filter 100 is to be used with.

In the exemplary embodiments of FIGS. 3 and 4, the housing 105 is tubular in shape and has a first end surface 150, a second end surface 155, an interior surface 160, and an exterior surface 165.

The housing 105 may be made of any suitable moldable material typically used for filter housings, including, but not limited to, polypropylene, polyethylene, and perfluoroalkoxy alkanes (PFAs). The interior surface 160 of the housing 105 includes a fluid channel 170 having a helical pattern such that the interior surface 160 has raised areas 175 located between turns of the helical pattern.

In some embodiments, the exterior surface 165 of the housing 105 has ribs 130 extending from the exterior surface 165. The ribs 130 can be utilized in the process of molding the housing. In an embodiment, center mold piece defining the helical pattern of the fluid channel can be unscrewed from the housing at the end of molding. In order to facilitate the remove of the center mold piece, the ribs can be used to lock the housing 105 in place in the mold and prevent the housing 105 from turning. The ribs 130 are shown as being straight lines in the Figures, however this is merely exemplary; in embodiments, ribs 130 can be any suitable shape. The housing 105 is distinct from a cage typically used in filters in that a cage has openings in the exterior surface to allow fluid into/out of the membrane. The exterior surface 165 of the housing can be free of openings.

The membrane 110 can be a porous membrane and can have a pleated configuration. In some embodiments a pleated membrane used as membrane 110 can be wrapped in a tubular configuration. Suitable materials that can be used for the membrane include, as non-limiting examples, polytetrafluoroethylene (PTFE), polyethylene (including ultra high molecular weight polyethylene (UPE)), and polysulfone. The membrane has a first edge, a second edge, and a first (or interior) and a second (or exterior) surface extending between the first and second edges. In embodiments, the membrane 110 can directly contact the interior surface 160. In an embodiment, the membrane 110 directly contacts the interior surface 160 only at raised areas 175. In an embodiment, the interior surface 160 is spaced apart from the membrane 110 at the helical fluid channel 170. In an embodiment, there is no cage or other such separate member located between the interior surface 160 and the membrane 110.

The core 125 may be a member that is surrounded by the membrane such that the membrane is disposed between the core 125 and the housing 105. In an embodiment, core 125 is tubular or cylindrical in shape. The core 125 can have a series of openings allowing fluid to pass between the membrane and a hollow center of the core 125. In embodiments, the core can be any suitable material including, as non-limiting examples, polypropylene, polyethylene, and perfluoroalkoxy alkanes (PFAs).

The first end cap 115 is connected to one or more of the first end surface 150 of the housing 105, the first edge of the membrane, and core 125, if present. Similarly, the second end cap 120 can be attached to one or more of the second end surface of the housing, the second edge of the membrane, and core 125, if present. The first and second end cap can be any suitable material, including, as non-limiting examples, polypropylene, polyethylene, and perfluoroalkoxy alkanes (PFAs). In an embodiment, one or both of the first end cap 115 and the second end cap 120 can be the same material as the housing. The first and second end caps 115, 120 can be attached to housing 105 and optionally other parts using conventional means to create a fluid tight seal and create an integral filter. Non-limiting examples of such attachment include welds such as heat or ultrasonic welds, mechanical attachment including seals provided at joints, or the like.

In some embodiments, the first end cap 115 can have an inlet 135a for allowing fluid to enter the filter and an outlet 135b to allow filtered fluid to exit the filter. In some embodiments the inlet 135a is fluidly connected to the start of the fluid channel 170 that is formed in the interior surface 160 of the housing 105 such that the fluid flows along fluid channel 170 and passes through the membrane 110 as it flows towards outlet 135b. Once the fluid passes through the membrane 110 it can flow out of housing 105 through the outlet 135b. In an embodiment, outlet 135b can be positioned in the center of the first end cap. In embodiments including a core 125, the outlet 135b can be fluidly connected to a hollow interior space of the core 125. In some embodiments the first end cap may also have a vent 135c that allows gas to be vented out of the filter 100.

When the filter 100 is assembled, the membrane can contact the raised area 175 of the interior surface of the housing 105. In some embodiments, the housing provides support through the raised area 175, for example to aid the membrane 110 in maintaining its shape when there is a pressure differential that could cause the membrane 110 to push outward against the housing 105. In an embodiment, the percentage of the interior surface of the housing contacting the membrane to provide support is balanced with the shape and dimensions of the fluid channel to ensure there is adequate flow in the filter 100. Thus, in some embodiments, the raised area 175 forms less than or equal to about 30%, 25%, 20%, 15%, or 10% of the interior surface 160 of the housing 105. In an embodiment, the raised area 175 forms a percentage of the surface area of interior surface 160 that is in a range from about 5% to about 30%, about 5% to about 25%, about 5% to about 20%, about 5% to about 15%, about 10% to about 30%, about 10% to about 25%, about 10% to about 20%, about 15% to about 30%, about 15% to about 25%, about 20% to about 30% of the surface area of interior surface 160, or any range and subrange therebetween.

In some embodiments, in order to ensure adequate flow and support for the membrane, a helical pitch HP of the fluid channel is less than or equal to about 60 mm, 55 mm, 50 mm, 45 mm, 40 mm, 35 mm, 30 mm, 25 mm, 20 mm, 15 mm, or 10 mm, or is in a range from about 5 mm to about 60 mm, about 5 mm to about 55 mm, about 5 mm to about 50 mm, about 5 mm to about 45 mm, about 5 mm to about 40 mm, about 5 mm to about 35 mm, about 5 mm to about 30 mm, about 5 mm to about 25 mm, about 5 mm to about 20 mm, about 10 to about 60 mm, about 10 to about 55 mm, about 10 mm to about 50 mm, about 10 mm to about 45 mm, about 10 mm to about 40 mm, about 10 mm to about 35 mm, about 10 mm to about 30 mm, about 10 mm to about 25 mm, about 10 mm to about 20 mm, about 15 mm to about 60 mm, about 15 mm to about 55 mm, about 15 mm to about 50 mm, about 15 mm to about 45 mm, about 15 mm to about 40 mm, about 15 mm to about 35 mm, about 15 mm to about 30 mm, about 15 mm to about 25 mm, about 15 mm to about 20 mm, about 20 mm to about 60 mm, about 20 mm to about 55 mm, about 20 mm to about 50 mm, about 20 mm to about 45 mm, about 20 mm to about 40 mm, about 20 mm to about 35 mm, about 20 mm to about 30 mm, about 25 mm to about 60 mm, about 25 mm to about 55 mm, about 25 mm to about 50 mm, about 25 mm to about 45 mm, about 25 mm to about 40 mm, about 25 mm to about 35 mm, about 25 mm to about 30 mm, about 30 mm to about 60 mm, about 30 mm to about 55 mm, about 30 mm to about 50 mm, about 30 mm to about 45 mm, about 30 mm to about 40 mm, about 30 mm to about 35 mm, about 40 mm to about 60 mm, about 45 mm to about 55 mm, about 40 mm to about 50 mm, about 40 mm to about 45 mm, about 45 mm to about 60 mm, about 45 mm to about 55 mm, about 45 mm to about 50 mm and all ranges and subranges therebetween. As used herein the helical pitch HP is the axial distance of one complete helix turn, as shown, for example, in FIG. 4.

In some embodiments, in order to ensure adequate flow and support for the membrane, a helical angle of the fluid channel HA is less than or equal to 45 degrees, 40 degrees, 35 degrees, 30 degrees, 25 degrees, 20 degrees, 15 degrees or 10 degrees, or is in a range from about 5 degrees to about 45 degrees, about 5 degrees to about 40 degrees, about 5 degrees to about 35 degrees, about 5 degrees to about 30 degrees, about 5 degrees to about 25 degrees, about 5 degrees to about 20 degrees, about 5 degrees to about 15 degrees, about 5 degrees to about 10 degrees, about 10 degrees to about 45 degrees, about 10 degrees to about 40 degrees, about 10 degrees to about 35 degrees, about 10 degrees to about 30 degrees, about 10 degrees to about 25 degrees, about 10 degrees to about 20 degrees, about 10 degrees to about 15 degrees, about 15 degrees to about 45 degrees, about 15 degrees to about 40 degrees, about 15 degrees to about 35 degrees, about 15 degrees to about 30 degrees, about 15 degrees to about 25 degrees, about 15 degrees to about 20 degrees, about 20 degrees to about 45 degrees, about 20 degrees to about 40 degrees, about 20 degrees to about 35 degrees, about 20 degrees to about 30 degrees, about 20 degrees to about 25 degrees and all ranges and subranges therebetween. As used herein, helical angle HA is the angle of the helix with respect to a plane perpendicular to the axis of the housing 105 as shown in FIG. 4. If the helical angle is too large, then the shape of the raised area will not provide adequate support because pleats of the membrane 110 are more likely to be pushed into the fluid channel 170 when pressure forces the membrane 110 against the housing 105.

Figure 5:
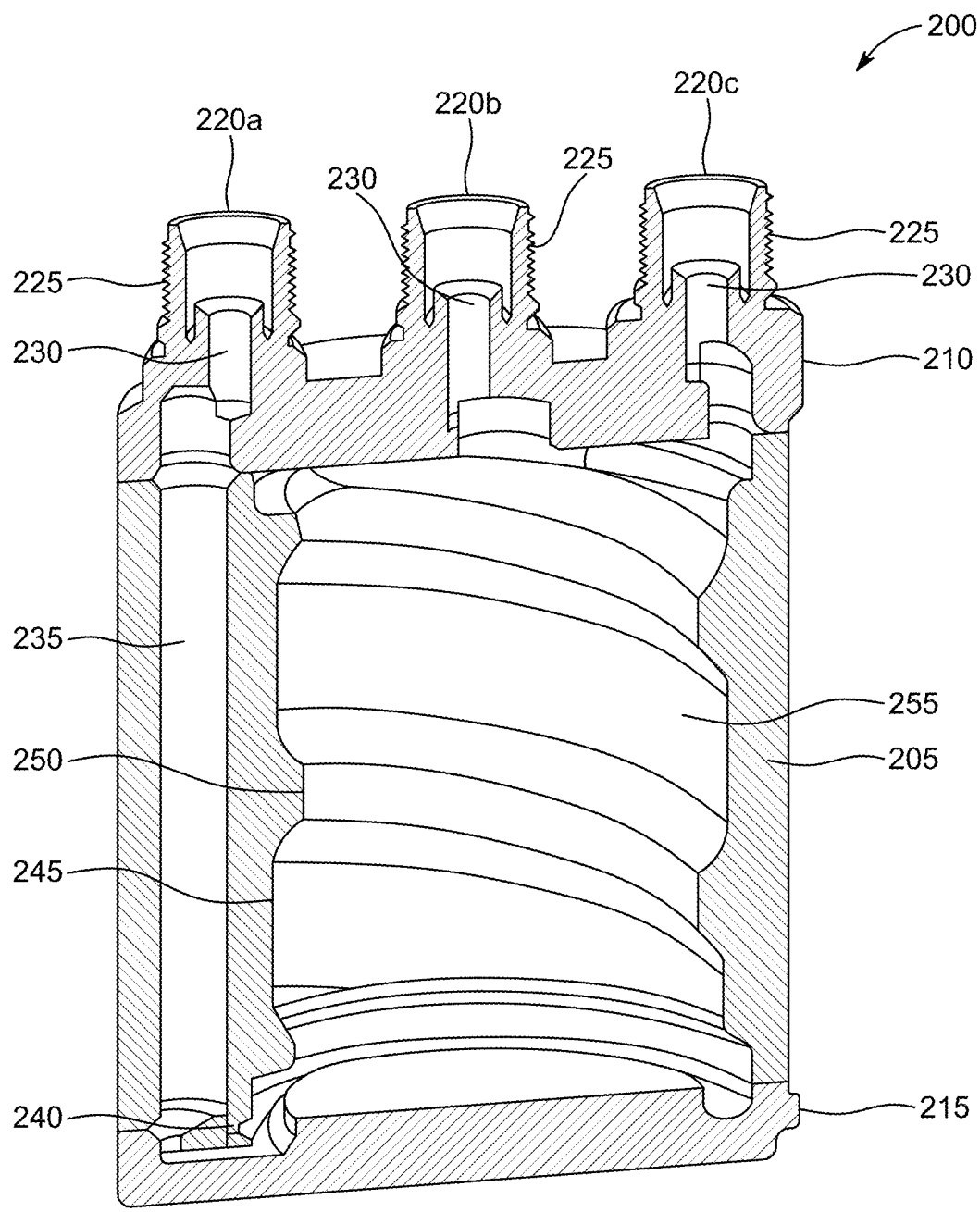
FIG. 5 is a cross-sectional view of an exemplary filter according to another embodiment.

FIG. 5 is a cross-sectional view of an exemplary filter according to another embodiment. Filter 200 includes housing 205, first end cap 210, and second end cap 215. First end cap 210 can include connectors 220*a,b,c*. In the embodiment shown in FIG. 5, the connectors 220*a,b,c* includes inlet 220*a*, outlet 220*b*, and vent 220*c*. Each of connectors 220*a,b,c* can include threading 225 and aperture 230. Filter 200 can further include a tube 235. Tube 235 can convey fluid received at inlet 220*a* to a port 240, through which the fluid can then pass into the fluid channel 245 defined between raised portions 250 of the interior surface 255. The fluid channel 245, raised portions 250, and interior surface 255 can be according to any description herein corresponding to the respective fluid channels, raised portions and interior surfaces, such as fluid channel 170 formed by raised portions 175 of interior surface 155, as described above and shown in FIGS. 3 and 4. Port 240 can be located at any point below a top of the fluid channel 245, such as the end of housing 205 where it meets first end cap 210. In an embodiment, port 240 provides the fluid from inlet 220*a* to fluid channel 245 at a bottom of housing 205, for example where the housing 205 meets second end cap 215. In such an embodiment, fluid provided to filter 200 at inlet 220*a* passes downwards through the tube 235 to port 240, where it is introduced into helical fluid channel 245. A membrane (not shown) can contact the raised portions 250 defining the fluid channel 245. The fluid can pass through the membrane to a center of the membrane which can optionally include a core, as described herein. The fluid that has passed through the membrane can exit the filter 200 by way of outlet 220*b*, which is in fluid communication with the core of or a space within the membrane on an opposite side of the membrane from fluid channel 245. Vent 220*c* can provide venting from the fluid channel 245, for example at the top of fluid channel 245 where housing 205 meets first end cap 210.

Aspects:

It is understood that any of aspects 1-12 can be combined with any of aspects 13-15 or 16-17. It is understood that any of aspects 13-15 can be combined with any of aspects 16-17.

Aspect 1. A filter comprising:
a housing having interior and exterior surfaces,
a membrane disposed within the housing, and
a fluid channel formed in the interior surface of the housing in a helical pattern with a helical pitch in an axial direction of the housing of less than or equal to about 60 mm, the fluid channel formed between raised portions of the interior surface of the housing.

Aspect 2. The filter according to aspect 1, wherein the helical pattern has a helical angle of less than or equal to about 45 degrees.

Aspect 3. The filter according to aspect 1 or aspect 2, further comprising a core disposed within the housing wherein the membrane is positioned between the core and the housing.

Aspect 4. The filter according to any of aspects 1-3, further comprising a first end cap, wherein the first end cap comprises a first opening acting as an inlet for fluid and a second opening acting as an outlet for the fluid.

Aspect 5. The filter according to aspect 4, wherein the first end cap further comprises a third opening acting as a vent.

Aspect 6. The filter according to aspect 4 or aspect 5, wherein the inlet for the fluid directs the fluid into the fluid channel.

Aspect 7. The filter according to any of aspects 4-6, wherein the filter includes a tube configured to receive the fluid from the inlet and a port configured to provide fluid to the fluid channel, and the tube and the port are configured such that the fluid is introduced into the fluid channel at a bottom of the fluid channel.

Aspect 8. The filter according to aspect 7, wherein the exterior surface of the housing has a generally cylindrical shape, and the tube is disposed in a projection extending outwards from the generally cylindrical outer surface of the housing.

Aspect 9. The filter according to aspect 6, wherein the outlet is configured to allow the fluid within the fluid channel to leave the filter.

Aspect 10. The filter according to any of aspects 4-9, wherein each of the inlet and the outlet have a different height.

Aspect 11. The filter according to any of aspects 1-10, wherein the membrane is in direct contact with the raised portions of the interior surface.

Aspect 12. The filter according to any of aspects 1-11, wherein there is no cage located between the membrane and the raised portions of the interior surface.

Aspect 13. A filter housing, comprising:
an interior surface;
an exterior surface; and
a fluid channel formed in the interior surface of the filter housing in a helical pattern with a helical pitch in an axial direction of the housing of less than or equal to about 60 mm, the fluid channel formed between raised portions of the interior surface of the housing.

Aspect 14. The housing according to aspect 13, wherein the helical pattern has a helical angle of less than or equal to about 45 degrees.

Aspect 15. The housing according to aspect 13 or aspect 14, wherein the housing includes a first end configured to be bonded to a first end cap and a second end configured to be bonded to a second end cap, wherein the first end cap includes a first opening acting as an inlet for fluid and a second opening acting as an outlet for the fluid.

Aspect 16. A method of filtering a fluid, comprising:
introducing the fluid into a filter through an inlet;

directing the fluid through a fluid channel formed in a housing of the filter, the fluid channel having a helical pattern with a helical pitch in an axial direction of the housing of less than or equal to about 60 mm, the fluid channel formed between raised portions of an interior surface of the housing; and passing the fluid through a membrane, wherein the membrane is in direct contact with the raised portions.

Aspect 17. The method according to aspect 16, wherein said directing the fluid through the fluid channel is performed prior to said passing the fluid through the membrane.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. Changes may be made in details, particularly in matters of shape, size, and arrangement of parts without exceeding the scope of the disclosure. The disclosure's scope is, of course, defined in the language in which the appended claims are expressed.

What is claimed is:

1. A filter comprising:
   a housing having one or more end surfaces, an interior surface, and an exterior surface,
   a membrane made of polysulfone disposed within the housing,
   a core comprising a plurality of series of openings in the interior surface of the housing to allow passing of fluid between the membrane and a hollow center of the core, wherein the core is disposed within the housing and is surrounded by the membrane,
   a fluid channel formed in the interior surface of the housing in a helical pattern with a helical pitch in an axial direction of the housing of less than or equal to about 50 mm, the fluid channel being formed between raised portions that are located between turns of the helical pattern of the interior surface of the housing, wherein the membrane is in direct contact with the raised portions, and
   a first end cap connected to the one or more end surfaces of the housing, edges of the membrane and the core, the first end cap comprises a first opening, a second opening and a third opening in the interior surface of the housing, the first opening acting as an inlet for fluid, the second opening acting as an outlet for the fluid and the third opening acting as a vent, the second opening is positioned in the center of the first end cap,
   the inlet in the interior surface of the housing to fluidly connect to a start of the fluid channel to pass the fluid through the membrane.

2. The filter of claim 1, wherein the helical pattern has a helical angle of less than or equal to about 45 degrees.

3. The filter of claim 1, further comprising the membrane is positioned between the core and the housing.

4. The filter of claim 1, wherein the inlet for the fluid directs the fluid into the fluid channel.

5. The filter of claim 1, wherein the filter includes a tube configured to receive the fluid from the inlet and a port configured to provide fluid to the fluid channel, and the tube and the port are configured such that the fluid is introduced into the fluid channel at a bottom of the fluid channel.

6. The filter of claim 5, wherein the exterior surface of the housing has a generally cylindrical shape, and the tube is disposed in a projection extending outwards from the generally cylindrical shape of the exterior surface of the housing.

7. The filter of claim 4, wherein the outlet is configured to allow the fluid within the fluid channel to leave the filter.

8. The filter of claim 1, wherein each of the inlet and the outlet have a different height.

9. The filter of claim 1, wherein the membrane is in direct contact with the raised portions of the interior surface.

10. The filter of claim 1, wherein there is no cage located between the membrane and the raised portions of the interior surface.

* * * * *